United States Patent Office 3,169,124
Patented Feb. 9, 1965

3,169,124
MONOAZO REACTIVE DYES
Hans Ischer and Hans Siegrist, both of Basel, Switzerland, assignors to Sandoz Ltd. (A/K/A Sandoz AG.), Basel, Switzerland
No Drawing. Filed Oct. 5, 1961, Ser. No. 143,059
Claims priority, application Switzerland, Oct. 6, 1960, 11,221/60
6 Claims. (Cl. 260—163)

This invention relates to dyes of the formula $$D(CH_2-NH-CO-R_2-O-SO_2-R_3)_n \qquad (I)$$

In this formula

D represents the radical of a dye, e.g. of a water-soluble monoazo or disazo dye, $R_2$ an aliphatic, aliphatic-aromatic or aliphatic-cycloaliphatic chain member which may be substituted and may contain hetero atoms, $R_3$ a low molecular alkyl radical which may be substituted, a low molecular dialkylamino radical, or an aryl radical of the benzene or naphthalene series which may be substituted.

—O—$R_2$—CO can have e.g. the following meanings:

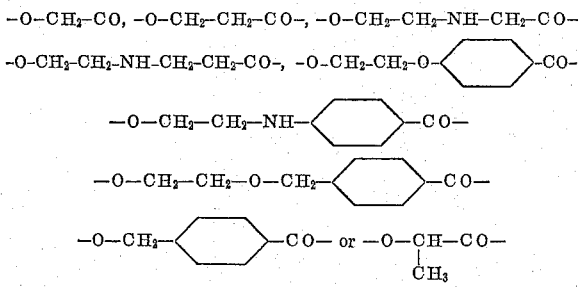

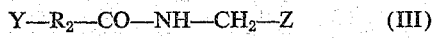

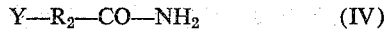

$R_3$—$SO_2$— denotes radicals of organic sulfonic acids, e.g. the radicals of the following acids which confer particularly good properties on the dyes: methanesulfonic, ethanesulfonic, β-chloroethanesulfonic, N-dimethylaminosulfonic, N-diethylaminosulfonic, benzenesulfonic, 2-methylbenzene-1-sulfonic, 4-methylbenzene-1-sulfonic, 4-ω-chloromethylbenzene-1-sulfonic, 3-chlorobenzene-1-sulfonic, 4-chlorobenzene-1-sulfonic, 4-bromobenzene-1-sulfonic, 3-bromobenzene-1-sulfonic, naphthalene-1-sulfonic, naphthalene -2-sulfonic, 2-methylnaphthalene-6-sulfonic acids, and naphthalene-di- and -trisulfonic acids.

The process for the production of the new dyes consists in reacting dyes possessing exchangeable hydrogen atoms, or organic compounds possessing exchangeable hydrogen atoms and in addition at least one substituent capable of dye formation, with a compound of the formula $$Y-R_2-CO-NH-CH_2-Z \qquad (III)$$

in which Y represents —OH or —O—$SO_2R_3$ and Z represents OH, chlorine or bromine, and converting the reaction products, when they contain radicals of organic compounds with substituents capable of dye formation, into dyes in any desired order, or, when Y stands for —OH, into their sulfonic acid esters.

The compounds of Formula III can be obtained from the corresponding carboxylic acid amides of the formula $$Y-R_2-CO-NH_2 \qquad (IV)$$

by condensation with formaldehyde in the normal manner in neutral to weakly alkaline aqueous solution or suspension, e.g. at room temperature and up to about 100° C. and in presence of trimethyl- or triethylamine, barium hydroxide or other basic or acid catalysts.

It is not however necessary to use the previously prepared compound of Formula III as reactant. In its place a compound of the formula $$Y-R_2-CO-NH_2 \qquad (IV)$$

together with symmetrical dihalogenodimethyl ether, can be employed. It is preferable to use about ½ mol of the ether to each mol of compound (IV), though an excess of the ether can be added if desired.

Azo dyes which are of special interest for the new process are those which contain in the diazo or coupling component unsulfonated aryl radicals of the benzene, diphenyl or naphthalene series, e.g. the radical of aminobenzene, 1-amino-2-, -3- or -4-methyl, -chloro-, -bromo-, -methoxy-, -ethoxy-, -acetylamino-, -propionylamino-, -carbomethoxyamino-, -carbethoxyaminobenzene, 1-amino-2,4-, -2,5- or -2,6-dimethylbenzene, 1-amino-2,4,6-trimethylbenzene, 1-amino-2,3- or -3,4-tetramethylenebenzene, 1- or 2-aminonaphthalene, 4-amino-1,1'-diphenyl, 4,4'-diamino-1,1'-diphenyl.

The preferred dyes of these large groups have the general Formula I, in which

D represents the radical of a water-soluble monoazo or disazo dye, and $R_2$ represents an aliphatic chain member which may be substituted, and $R_3$ a low molecular alkyl or aryl radical which may be substituted by halogen.

The symmetrical dichloro- or dibromodimethyl ethers are particularly advantageous.

The reaction of the dye or of its preliminary product with the dihalogenodimethyl ether and the acid amide of Formula IV is effected with stoichiometric amounts of the reactants or with an excess of the ether and the amide, which improves the yields.

The production of the dyes is carried out to advantage in presence of an agent which splits off water, e.g. 80 to 100% sulfuric acid or chlorosulfonic acid, at temperatures of 0° to about 60° C. for several hours. The sulfonic acid esters obtained can be isolated, for example, by salting out; it is best to filter them with suction and they are then washed with sodium chloride solution until neutral and dried.

The dyes obtained form a chemical linkage with the fiber and dye wool, silk, synthetic polyamide fibers, leather, and fibers of natural and regenerated cellulose by exhaustion dyeing, padding or printing processes in shades fast to light, milling, water, washing, perspiration, chlorine, dry cleaning, alkali, rubbing and cross dyeing.

They can be fixed on the fiber by alkaline treatment, the normal method for reactive dyes. Without fixation treatment of this type, however, the dye show good building-up properties on animal fibers and synthetic polyamide fibers and give dyeings with the good fastness properties mentioned above.

In the following examples the parts and percentages are by weight and the temperatures in degrees centigrade.

EXAMPLE 1

43.6 parts of the monoazo dye obtained by coupling 1-diazo-2,4-dimethylbenzene with 1-hydroxynaphthalene-3,6-disulfonic acid in alkaline medium, are dissolved in 300 parts of 90% sulfuric acid at 15–20°. 27.3 parts of p-tosyl-α-oxypropionic acid methylol amide are added in small portions with stirring and the temperature raised to 35–40°. As soon as no further starting dye is indicated, the reaction mass is cooled to about 15° and run into 3000 parts of ice. The precipitated dye is filtered off, converted into the sodium salt, isolated, and dried at low temperature with vacuum.

The new dye is an orange-brown powder which dissolves in water with a scarlet coloration. Dyed on wool from a weakly acid bath, if necessary with the addition of a levelling agent, it gives very brilliant level shades of good fastness to light and washing.

In place of the p-tosyl-α-oxypropionic acid hydroxymethylamide used in this example, the corresponding p-tosyl-β-oxy derivative can be used to give a dye with very similar properties.

The p-tosyl-α-oxypropionic acid hydroxymethylamide used in this example can be obtained, for example, from p-tosyl-α-oxypropionic acid chloride by reaction with ammonia to give the corresponding acid amide and subsequent condensation with formaldehyde at room temperature in a neutral to weakly alkaline medium, if necessary in the presence of a catalyst such as triethylamine.

EXAMPLE 2

54.1 parts of the monoazo dye obtained by coupling diazotized 1-aminobenzene-2-sulfonic acid with 2-(2',4', 6' - trimethyl)-phenylamino-8-hydroxynaphthalene 6-sulfonic acid in acid medium, are dissolved in 500 parts of 96% sulfuric acid at 15–20° with stirring. The solution is cooled to 1–5° and 26 parts of O-(p-toluylsulfonyl)-glycolyl-N-methylol amide are added in small portions. After this addition it is constantly stirred until it reaches room temperature. Stirring is continued for 2 hours, then the solution is poured onto 1800 parts of ice and the precipitated dye filtered off. It is purified by dissolving in 2000 parts of water and precipitation with 400 parts of common salt, this procedure being repeated twice.

The isolated dye is washed with common salt solution and dried with vacuum. It is a red-colored powder which dyes nylon and wool in red shades fast to light and wet treatments.

When in place of 26 parts of O-(p-toluylsulfonyl)-glycolyl-N-methylol amide, 129 parts of the sulfuric acid condensation solution of O-(-toluylsulfonyl)-glycolic acid amide and α,α'-dichlorodimethyl ether are used, the identical dye is obtained.

In the following table are enumerated further dyes which can be produced in an analogous way. They are characterized by their diazo and coupling components, the coupling medium, the reaction medium, and the shade of their dyeings, on wool and cotton.

| Example No. | Diazo Component | Coupling Component | Coupling Medium | Reaction Medium | Shade on Wool and Cotton |
|---|---|---|---|---|---|
| 3 | 1-aminobenzene-2,5-disulfonic acid | 1-(2',4'-dimethyl)-phenyl-3-methyl-5-pyrazolone. | Alkaline | O-(p-toluyl-sulfonyl)-glycolyl-N-methylol amide. | Yellow. |
| 4 | 1-aminobenzene-2-sulfonic acid | 2-(2',4'-dimethyl)-phenylamino-8-hydroxynaphthalene-6-sulfonic acid. | Acid | O-(methylsulfonyl)-glycolyl-N-methylolamide. | Red. |
| 5 | ___do___ | ___do___ | ___do___ | O-(p-bromophenylsulfonyl)-glycolyl-N-methylolamide. | Do. |
| 6 | ___do___ | ___do___ | ___do___ | O-(p-toluylsulfonyl)-3-oxypropionyl-N-methylolamide. | Do. |
| 7 | ___do___ | ___do___ | ___do___ | O-(p-toluylsulfonyl)-2-oxypropionyl-N-methylolamide. | Do. |
| 8 | ___do___ | ___do___ | ___do___ | O-(p-toluylsulfonyl)-glycolyl-N-chloromethylamide. | Do. |
| 9 | 2-aminobenzene-1-sulfonic acid | 2-(4'-methyl)-phenylamino-8-hydroxynaphthalene-6-sulfonic acid. | ___do___ | Chlorophenylsulfonyl-glycolyl-N-methylolamide. | Do. |
| 10 | ___do___ | 1-(4'-methyl)-phenylamino-8-hydroxynaphthalene-4-sulfonic acid. | Alkaline | ___do___ | Violet. |
| 11 | ___do___ | 2-(2'-4'-dimethyl)-phenylamino-5-phenylsulfonyloxynaphthalene-7-sulfonic acid. | Acid | ___do___ | Orange. |
| 12 | ___do___ | 1 - (4' - methyl) - phenyl - 3 - methyl-5-pyrazolone. | Alkaline | O - (p - toluylsulfonyl) - glycolyl - N - methylolamide. | Yellow. |
| 13 | 2 - amino - 5 - chloro - benzene - 1 - sulfonic acid. | 2 - (2', 4', 6' - trimethyl) - phenylamino - 8 - hydroxynaphthalene - 6 - sulfonic acid. | Acid | ___do___ | Red. |
| 14 | 4-aminobenzene-1-sulfonic acid | ___do___ | ___do___ | ___do___ | Do. |
| 15 | 2-aminobenzene-1-sulfonic acid | 1 - (2' - chloro - 4', 6' - dimethyl)-phenyl-3-methyl-5-pyrazolone. | Alkaline | ___do___ | Yellow. |
| 16 | ___do___ | 1 - (4' - methoxy) - phenyl - 3 - methyl-5-pyrazolone. | ___do___ | ___do___ | Do. |
| 17 | 1-amino-2,4-dimethyl-benzene | 1 - hydroxynaphthalene - 3, 6 - disulfonic acid. | ___do___ | O - (methyl - sulfonyl) - glycolyl - N - chloromethylamide. | Red. |
| 18 | ___do___ | ___do___ | ___do___ | O - (methylsulfonyl) - glycolyl - N - methylolamide. | Do. |
| 19 | ___do___ | ___do___ | ___do___ | O - (methylsulfonyl) - 3 - oxypropionyl-N-methylolamide. | Do. |
| 20 | ___do___ | ___do___ | ___do___ | O - (p - bromophenylsulfonyl) - 2 - oxypropionyl-N-methylolamide. | Do. |
| 21 | 1-amino-4-methoxybenzene | 1 - hydroxynaphthalene - 4, 6 - disulfonic acid. | ___do___ | O - (methylsulfonyl) - glycolyl - N - methylolamide. | Do. |
| 22 | ___do___ | 1 - hydroxy - 8 - acetyl - aminonaphthalene-3,6-disulfonic acid. | ___do___ | ___do___ | Bluish red. |
| 23 | 1-amino-3-chlorobenzene | 1 - hydroxy - 8 - benzoylamino - 3, 6-disulfonic acid. | ___do___ | ___do___ | Red. |
| 24 | 1 - amino - 5 - O - (p - toluylsulfonyl)-glycolylamino-methyl-benzene. | 1 - hydroxynaphthalene - 3, 6 - disulfonic acid. | ___do___ | ___do___ | Do. |
| 25 | 1 - amino - 4 - ethoxy - 3 - O - (p - toluylsulfonyl) - glycolaminomethyl-benzene. | 1 - phenyl - 3 - methyl - 5 - pyrazolone-3'-sulfonic acid. | ___do___ | ___do___ | Yellow. |

Formulae of representative dyes of the foregoing examples are as follows:

*Example 1*

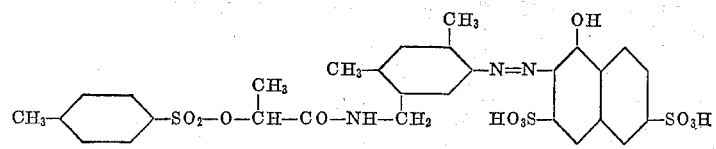

Example 2

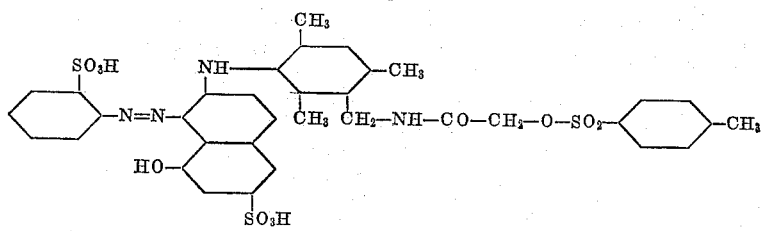

Example 3

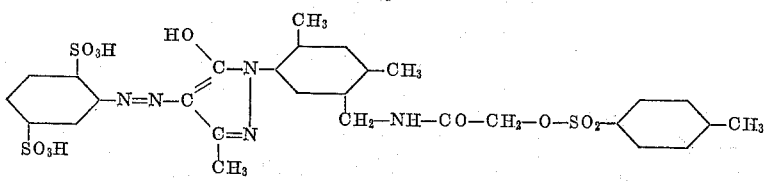

Example 9

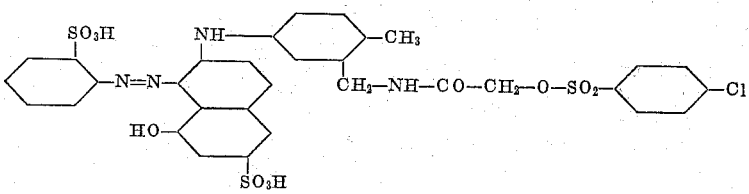

Example 15

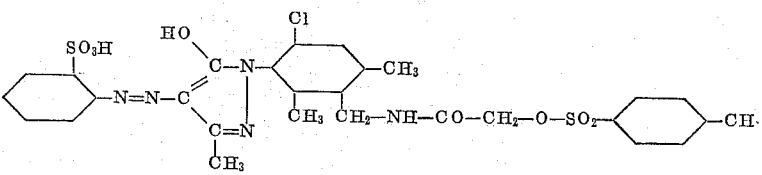

Example 21

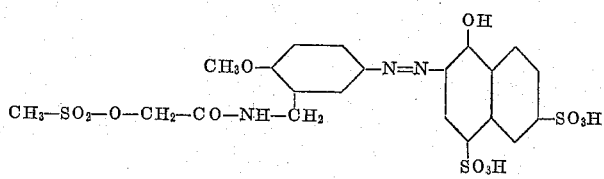

Example 23

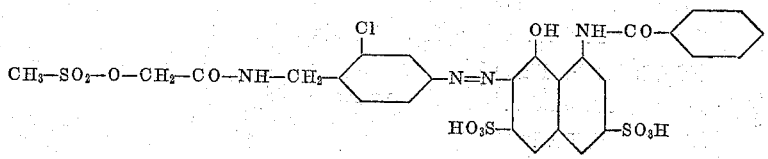

Example 25

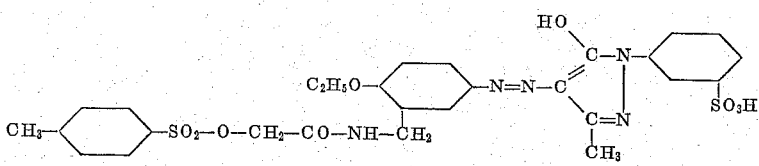

Having thus disclosed the invention, what we claim is:
1. A monoazo dye of the formula

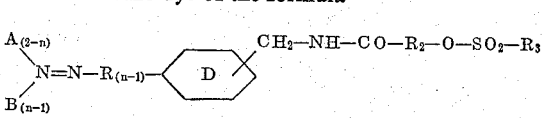

wherein A is a member selected from the group consisting of sulfo-hydroxynaphthyl and 1-sulfophenyl-5-pyrazolonyl, B is sulfophenyl, R is a divalent radical selected from the group consisting of

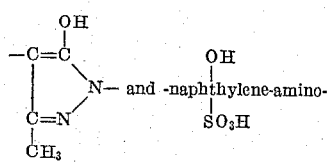

-amino- being bound to a different nucleus than —OH, $R_2$ is a member selected from the group consisting of

—CH$_2$—, —CH$_2$CH$_2$—, —CH$_2$—NH—CH$_2$CH$_2$—

—CH$_2$CH$_2$—NH—CH$_2$CH$_2$—, —⟨ ⟩—O—CH$_2$CH$_2$—

—⟨ ⟩—NH—CH$_2$CH$_2$—, —⟨ ⟩—CH$_2$—O—CH$_2$CH$_2$—

—⟨ ⟩—CH$_2$— and

$R_3$ is a member selected from the group consisting of methyl, phenyl, methylphenyl, chlorophenyl and bromophenyl,
the nucleus D contains 1 to 3 substituents selected from the group consisting of methyl, methoxy, ethoxy and chlorine, the said —CH$_2$—NH—CO—R$_2$—O—SO$_2$—R$_3$ group being in ortho-position to one of the last-named substituents, and $n$ is one of the integers 1 and 2.

2. The reactive dye of the formula

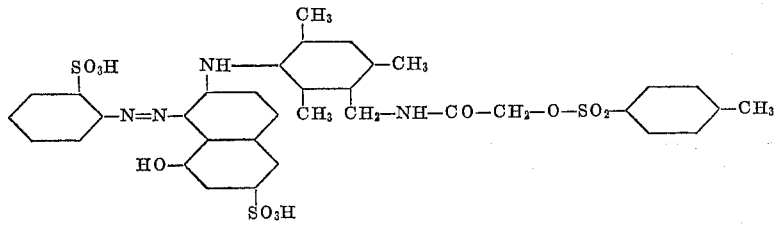

3. The reactive dye of the formula

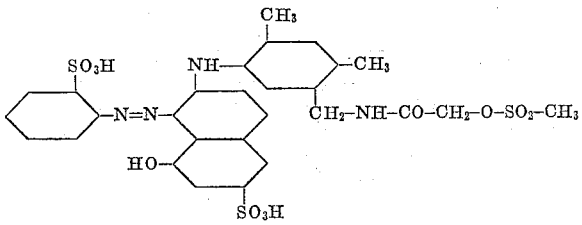

4. The reactive dye of the formula

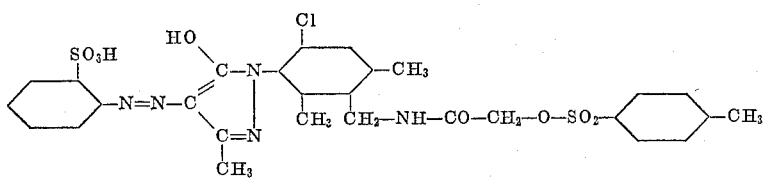

5. The reactive dye of the formula

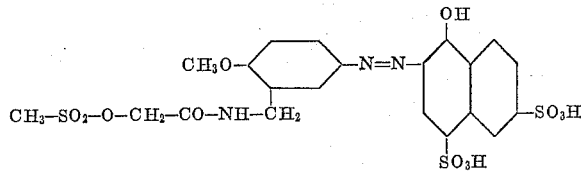

6. The reactive dye of the formula

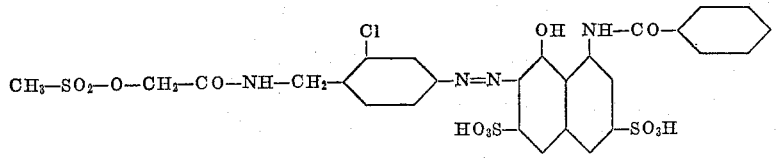

References Cited in the file of this patent
UNITED STATES PATENTS
2,975,167    Schwander _____ Mar. 14, 1961
FOREIGN PATENTS
1,245,115    France _____ Sept. 26, 1960
OTHER REFERENCES
Wegmann, J.: Textil-Praxis, October 1958, pages 1056–1061.